(No Model.)
2 Sheets—Sheet 1.
P. SWEENEY.
JOURNAL BEARING FOR CAR AXLES.
No. 483,405.
Patented Sept. 27, 1892.
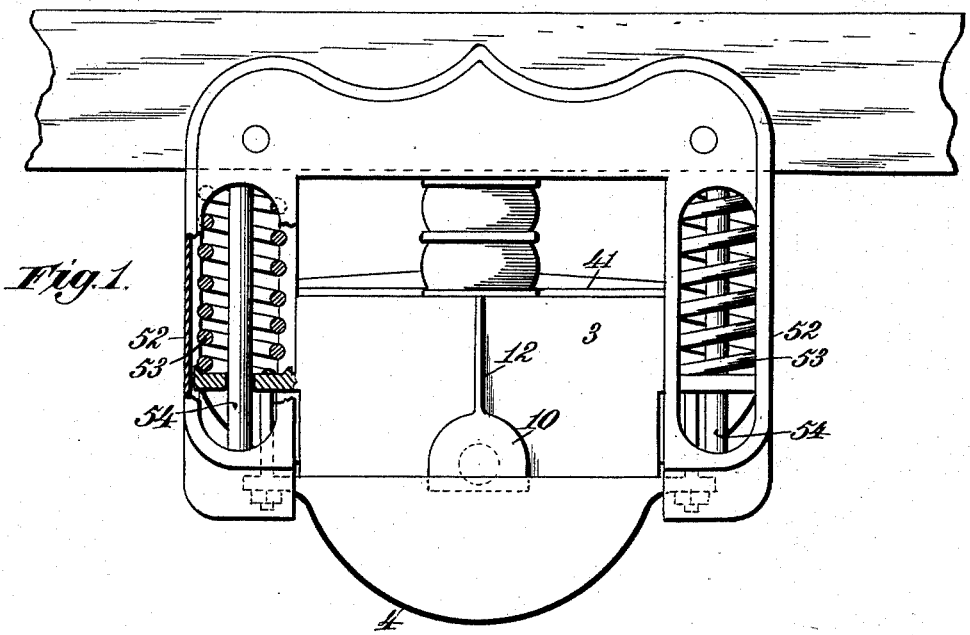
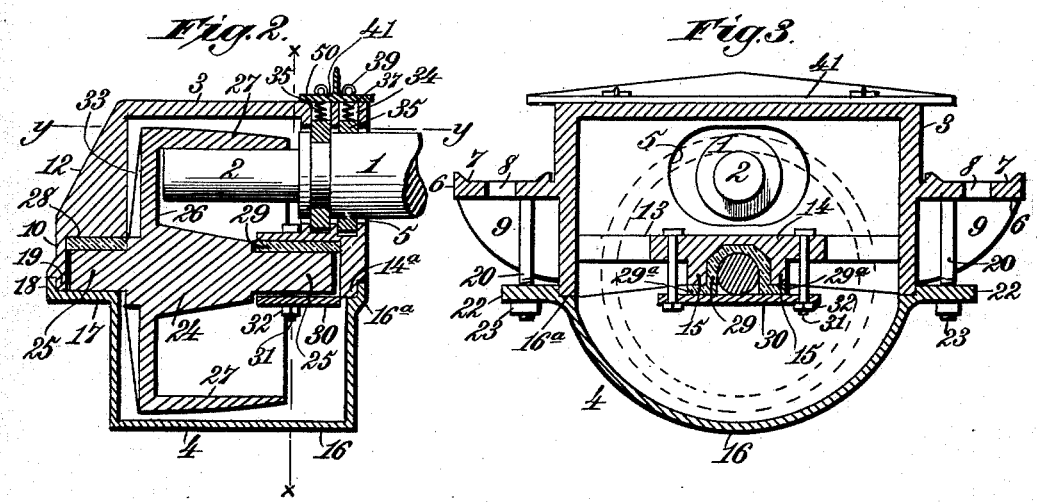
Witnesses:
Robert Gwatt
J. A. Rutherford
Inventor:
Peter Sweeney
By James L. Norris
Atty.

(No Model.) 2 Sheets—Sheet 2.
P. SWEENEY.
JOURNAL BEARING FOR CAR AXLES.
No. 483,405. Patented Sept. 27, 1892.
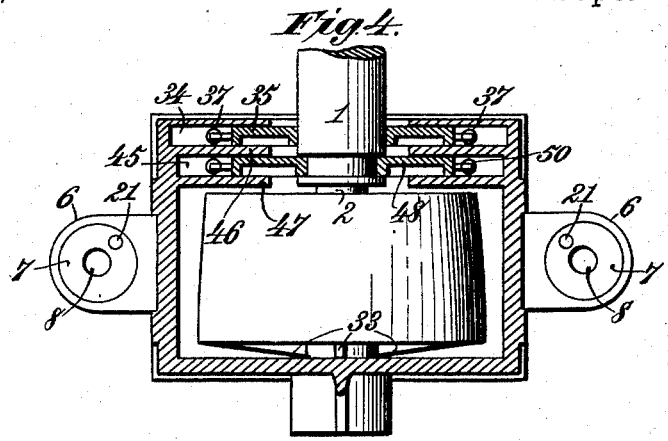
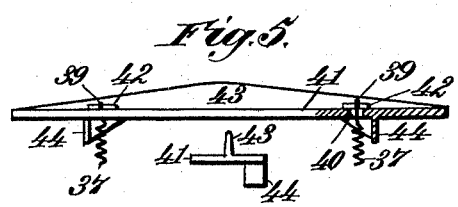
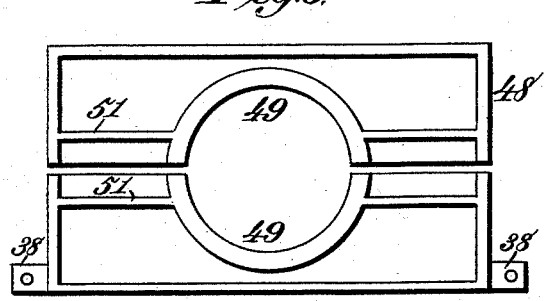
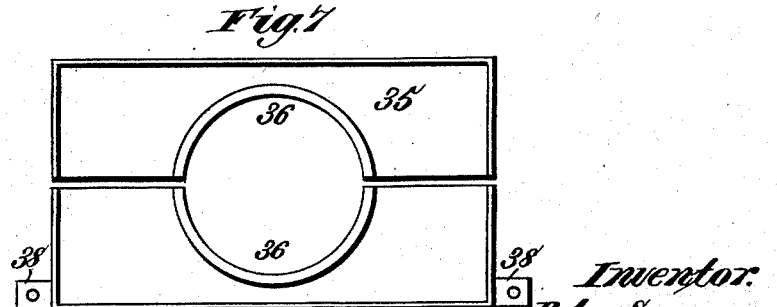
Witnesses. Inventor:
Peter Sweeney.
By James L. Norris.
Atty.
THE NORRIS PETERS CO., PHOTO-LITHO., WASHINGTON, D. C.

UNITED STATES PATENT OFFICE.

PETER SWEENEY, OF NEW YORK, N. Y., ASSIGNOR OF ONE-HALF TO CHARLES H. BOYER, OF SAME PLACE.

JOURNAL-BEARING FOR CAR-AXLES.

SPECIFICATION forming part of Letters Patent No. 483,405, dated September 27, 1892.

Application filed November 27, 1891. Serial No. 413,312. (No model.)

*To all whom it may concern:*

Be it known that I, PETER SWEENEY, a citizen of the United States, residing at New York, in the county of New York and State of New York, have invented new and useful Improvements in Journal-Bearings for Car-Axles, of which the following is a specification.

My invention relates to that construction of journal-boxes for railway car-axles shown and described in the Letters Patent granted me the 18th day of February 1890, No. 421,783.

It is a further purpose of my invention to prevent the escape of oil from the interior of the journal-box and at the same time to provide an economical, durable, and simple construction thereof by which the entrance of impurities of any kind from the surrounding air—such as dust and grit—shall be effectually avoided, whereby the serviceable lifetime of the device is greatly prolonged. My invention, in short, seeks to simplify and improve the construction and operation of the invention shown in my patent above referred to, to remove the objections discovered by practical use, to produce a material economy in the manufacture of such journal housings or casings and the parts constituting the journal-bearing, and to enable the casing to be quickly and easily opened or taken apart and the parts thereof reunited with equal facility.

It is also one purpose of my invention to provide a novel construction of devices for sustaining the end-thrust of the car-axles and preventing the same from straining or injuring the antifriction-bearing and to combine with the journal housing or casing simple and effective means for excluding dust and for allowing suitable endwise play of the thrust-plate and dust-plate.

The invention consists in the several novel features of construction and new combinations of parts hereinafter fully set forth, and then more particularly pointed out and defined in the claims which conclude this specification.

To enable others skilled in the art to make, construct, and use my said invention, I will proceed to describe the same in detail, reference being had to the accompanying drawings, in which—

Figure 1 is a front elevation, partly in section, showing the journal-casing connected with a car. Fig. 2 is a central vertical section parallel with the axle. Fig. 3 is a transverse section on the line $xx$, Fig. 2. Fig. 4 is a horizontal section on the line $yy$, Fig. 2. Fig. 5 is a detail view of the covering-plate in side and end elevation. Fig. 6 is a face elevation of the thrust-plate. Fig. 7 is a similar view of the dust-plate.

In the drawings the reference numeral 1 indicates the car-axle, upon which the car-wheels are mounted in the ordinary manner. The journals 2 of this axle are usually of reduced diameter as compared with the body portion, as shown in Figs. 2 and 3.

The journal housing or casing when constructed in accordance with the preferred form consists of but two parts 3 and 4, having a substantially-horizontal line of division and union. The upper of these two parts is an essentially-rectangular structure 3, having in its rear wall an elliptical opening 5, the major axis thereof being parallel with the top of the casing. At each end of the part 3 is a projecting bracket 6, having a cupped upper surface 7, with a central opening 8, the bracket being strongly braced by a web 9 of metal connecting its central lower face to the end of the casing. Upon the outer face of the said housing is formed a projecting hood 10, centrally arranged and braced by a vertical web 12. This hood is closed to the exterior at all points save its lower face, which is open to enable it to receive the journal of the antifriction-bearing and its metallic cushion or pillow-block, as described hereinafter.

Projecting horizontally inward or toward the interior of the housing from the rear wall of the same at a point below the opening 5 is a horizontal web or ledge of metal 13, extending from end to end of the casing, but having a width at its central and broadest portion of less than half the width of the interior chamber in which it lies. This ledge projects from a thickened portion 14 of the rear wall, which drops below said ledge and extends, with gradually-increasing width, to the ends of the casing, and thence along the ends. From the lower face of this web 13 drop two ribs 15 upon opposite sides of the central transverse line of the housing or casing to form a seat for the cushion or pillow-block of the inner journal of the antifriction-bearing or the journal thereof lying next to the car. The lower portion of the housing is composed of a substantially-semicylindrical shell 16, having its closed convex side downward. Along its open top is formed a rabbet 16ª, which receives the edge of the hanging wall or flange 14ª on the ends of the upper part and upon its front face. A web or plate 17 projects outwardly from the front of the lower part and lies beneath the open lower side of the hood 10. Along the front edge and both parallel edges of the web 17 is a narrow flange 18, which overlaps on the hood 10, which is gradually thickened at its lower edge and provided with a rabbet 19 to receive the flange 18. The lower portion 4 is attached to the upper part 3 by bolts 20, dropped through openings 21 in the end brackets 6, their lower ends passing through end brackets 22 on the lower part 4, and receiving-nuts 23, which lie beneath said brackets 22.

The antifriction-bearing is composed of a pulley having a hub 24, provided with reduced journals 25, near the outer one of which is formed the flat circular part of said pulley 26, having a diameter to enable it to turn easily in the casing and provided with a broad strong flange 27, which is turned toward the rear of the housing. The reduced journals 25 of the antifriction-pulley are of such length that they lie close to the front vertical face of the hood 10 and the thickened vertical rear wall 14. These journals lie in cushions 28 and 29 of brass or other suitable metal or metallic composition, the outer one of which 28 is held in the hood 10 by the projecting web or plate 17. The pillow-block 29 is held in place between the drop flanges or ribs 15 by a plate 30, fastened by two bolts 31, which are dropped through openings in the web or ledge 13, their lower ends passing through openings in the plate and receiving nuts 32. The pillow-block 29 is provided with laterally-turned edges 29ª, which lie beneath the edges of the drop-ribs 15, thus giving ample room for the journal 25. I may, however, form a half-round seat or recess in the plate 30 for the journal to lie in without contact, and in such case I may, if preferred, dispense with the laterally-turned parts 29ª on the pillow-block 29. The reduced journals 25 being of substantially-equal length with the pillow-blocks and the hub of the pulley being of such length as to span the tranverse space of the housing or casing, there will be no material play in the latter and the pillow-blocks will be held from shifting or moving toward the interior. The flat circular pulley-plate 26 is strengthened by outer ribs 33. The flange 27 has a width equal, or nearly so, to the length of the reduced journal 2 of the axle 1, which has rolling contact upon the inner plano-cylindrical face of said flange.

In the upper flat wall of the upper part 3, at a little distance from the rear edge thereof, is a straight slot 34, extending nearly to the ends of the casing, its lower limit lying somewhat below the lowest part of the elliptical opening 5. In this slot or recess, which is substantially parallel with the rear vertical wall of the housing, is placed a horizontally-divided dust-plate 35, each of its similar parts having a semicircular opening 36 in its edge to surround the axle, against which the lower part of said plate is held by springs 37, hooked at one end into lugs 38 on the lower part of the plate and provided at their upper ends with loops 39, which pass through openings 40 in a covering-plate 41, lying upon the top of the casing and closing the recess or slot 34, the loops 39 being adapted to receive supports 42. The covering-plate 41 is provided with a strengthening-rib 43 on its upper face and has drop-lugs 44 on the lower face, which lie in the slot 34 and limit the longitudinal movement of the plate as the axle plays in the opening 5. At a little distance from the slot 34 and parallel therewith is formed a second and somewhat-similar recess 45, lying between the inner wall 46 of the slot 34, and a separate parallel wall 47, the outer face of which is nearly flush with the end of the axle lying adjacent to its reduced journal. The elliptical opening 5 is reproduced in both the walls 46 and 47, and in the recess or space 45 is arranged an independent two-part thrust-plate 48 of substantially the same construction as that heretofore described, save that its semicircular openings 49 are of less radius, as this plate lies in a circumferential slot in the axle near the reduced journal 25. Its lower part is drawn up against the journal by springs 50 in the same manner as the lower part of the plate 35, the upper sections of both plates being retained in place by their own gravity and held from displacement or play in the line of the axle by means of ribs 51, formed on one or both faces and having such width or relief as to practically fill the spaces in which the plates lie. The plate 48 forms a check which serves to prevent the journal 2 from longitudinal play. The recess 45 is closed at the top by the covering-plate 41, and the two plates 35 and 45 close the axle-openings 5 and not only effectually exclude dust and grit from the interior of the housing or casing, but prevent the escape of the lubricating-oil, which is placed in the lower portion of the housing, where it covers the lower part of the flange 27, by which it is carried up to the journal 2 of the axle and drips down upon both the journals 25 and their bearings.

The casing is attached to the car by means of hangers 52, which preferably consist of skeleton frames of such size as to conveniently receive the end brackets 6, upon the cupped faces of which rest the coiled springs 53, which sustain the car. These springs are coiled around and outside of guide-bars 54, which pass through the openings 8 in the brackets 6. The guide-bars 54 are usually cast in one piece with the lower ends of the hangers or skeleton frames 52.

By my invention the antifriction-pulley bearing is formed in a single casting, which greatly reduces the cost of construction. The leakage of the oil from the housing or casing is effectually prevented, also, while the housing is simplified, cheapened, and rendered more durable.

I also provide a very effective dust-plate, which is always tight and preserves the interior of the housing from the entrance of dust and grit, which would wear away the journals and their pillow-blocks. As the end-thrust is wholly removed from the dust-plate, it wears slowly and is always tight.

I also provide simplified and improved means for taking up the journal-thrust in both directions, the thrust-plate being located in the strongest part of the housing and where it may contribute to both the exclusion of dust and the perfect retention of the oil.

What I claim is—

1. In a journal-bearing, a housing formed in two parts divided horizontally, the upper part having a hood upon its outer face to receive one journal of an inner antifriction-pulley and the lower part being provided with a projecting plate to lie beneath and close the lower open side of the hood, said parts being united by a rabbet-joint and held by bolts, substantially as described.

2. In a journal-bearing, a horizontally-divided housing, the upper part having an outwardly-projecting hood, in combination with an antifriction-pulley arranged in said housing, its outer journal received by a pillow-block lying in the hood and its other journal by a similar block lying in a seat in the rear of the upper part, and a plate supporting the latter block and fastened by bolts, the lower member of the casing being provided with a plate projecting from its outer face and lying beneath and closing the hood, substantially as described.

3. In a journal-bearing, the combination, with a housing, of an interiorly-arranged flanged antifriction-pulley, a car-axle journal on which the flange of said pulley rests, a two-part dust-plate surrounding the axle and lying in a recess in the rear of the housing, and an independent thrust-plate formed in two parts lying in a circumferential channel in the axle and in a recess in the rear of the housing, substantially as described.

4. In a journal-bearing, the combination, with a housing, of a car-axle entering the same, a dust-plate surrounding the exterior of the axle and having play in a recess in said housing surrounding the axle-opening, and a thrust-plate lying in a similar recess and in a circumferential slot or channel in said axle, substantially as described.

5. In a journal-bearing, the combination, with a housing having an axle-opening and a recess surrounding the same, of a plate lying in said recess, springs connected to end lugs on the lower ends of said plate, and a movable covering-plate resting on the housing, to which the other ends of said springs are connected.

6. In a journal-bearing, the combination, with a housing, of an axle entering the same, a dust-plate and a thrust-plate lying in parallel recesses surrounding the axle-openings, springs connected to end lugs on the lower members of said plates, and a movable covering-plate resting on the housing, to which the other ends of said springs are connected, substantially as described.

In testimony whereof I have hereunto set my hand and affixed my seal in presence of two subscribing witnesses.

PETER SWEENEY. [L. S.]

Witnesses:
LOUIS KLEIN,
JOHN G. CHARLES.